United States Patent [19]
Dunn

[11] Patent Number: 5,823,478
[45] Date of Patent: Oct. 20, 1998

[54] PRESSURE FEED FOR LIQUID PROPELLANT

[75] Inventor: Bruce P. Dunn, Vancouver, Canada

[73] Assignee: The University of British Columbia, Vancouver, Canada

[21] Appl. No.: 503,352

[22] Filed: Jul. 17, 1995

[51] Int. Cl.$^6$ ....................................................... B64G 1/40
[52] U.S. Cl. ..................... 244/172; 244/135 R; 244/162; 60/259
[58] Field of Search ................................ 244/135 R, 162, 244/172; 60/257, 259, 39.48, 734, 240, 204

[56] References Cited

U.S. PATENT DOCUMENTS

| | | | |
|---|---|---|---|
| 3,350,886 | 11/1967 | Feraud et al. ............................ | 60/259 |
| 3,427,808 | 2/1969 | Butcher .................................... | 60/259 |
| 3,525,217 | 8/1970 | de Mattia, Jr. et al. ............... | 60/39.48 |
| 3,595,020 | 7/1971 | Schubert .................................. | 60/259 |
| 3,668,868 | 6/1972 | Krzycki .................................... | 60/259 |
| 3,740,945 | 6/1973 | Lovingham .............................. | 60/259 |
| 3,945,203 | 3/1976 | Kayser ..................................... | 60/259 |
| 4,132,165 | 1/1979 | Lesson . | |
| 4,880,185 | 11/1989 | Apfel ....................................... | 244/172 |
| 5,207,399 | 5/1993 | Risenberg . | |
| 5,263,666 | 11/1993 | Hubert et al. ........................... | 244/172 |
| 5,471,833 | 12/1995 | Pahl ......................................... | 60/259 |

FOREIGN PATENT DOCUMENTS 2051246A  1/1981  Hong Kong .

OTHER PUBLICATIONS

Modern Engineering Design of Liquid Propellant Rocket Engines Huzel et al.—American Institute of Aeronautics & Astronautics vol. 147 (1992) Chapter 5 pp. 135–153.

Primary Examiner—Galen L. Barefoot
Attorney, Agent, or Firm—Christensen, O'Connor Johnson & Kindness

[57] ABSTRACT

One of the propellants used in a bipropellant rocket engine has a vapor pressure sufficiently high under prevailing condition to generate vapor at a pressure sufficiently high to pressurize both the volatile component and the second rocket propellant and provide substantially the sole means for forcing the two rocket propellants from their storage to the rocket engine. In the preferred arrangement, both the components will be stored within the same pressure vessel, one preferably being contained within an expandable/collapsible bladder.

20 Claims, 4 Drawing Sheets

PRESSURE FEED FOR LIQUID PROPELLANT

FIELD OF INVENTION

The present invention relates to a liquid propellant feed system for bipropellant rockets.

BACKGROUND OF THE INVENTION

Most rocket utilize either pump fed liquid propellants, or solid propellants. For some applications, bipropellant pressure fed liquid rockets are used. Propellants are stored in tanks which are pressurized with gas by one of several means. High pressure propellants are fed from the pressurized tank to the rocket engine. The usual propellants used are monomethyl hydrazine (fuel) and nitrogen tetroxide (oxidizer).

Pressure fed liquid propellant rockets typically have a lower propellant fraction and thus lower are performing than pump fed liquid rockets. However, they are reliable, and well adapted to missions where the engine must be started and stopped many times. Pressure fed bipropellant liquid rockets are used in such systems as the orbital maneuvering system and the attitude control system of the Space Shuttle. Pressure fed liquid rocket engines are also used in interplanetary spacecraft for course correction, orbital insertion, etc. (e.g. Mars Observer).

For use in rocket vehicles operating in zero gravity, pressure fed liquid propellant systems must have some way of insuring that upon initial opening of the valves from the propellant tank(s) to the engine, the tank expels liquid propellant rather than pressurizing gas. In one system for this, propellant acquisition devices consisting of screens or closely spaced vanes are employed over the tank outlet. Propellant is maintained by surface tension at the outlet of the tank, to allow initial rocket engine operation (once the rocket accelerates, the propellant moves to the outlet end of the tank). In another system, the propellant is separated from the pressurizing gas by a flexible diaphragm or bladder. The diaphragm allows the gas to apply pressure to liquid, but prevents the gas from ever entering the tank outlet.

The simplest method of pressurizing a liquid propellant tank is a "blowdown" system. The tank is filled only partly with propellant, then high pressure gas is introduced into the "ullage space" (the part of the tank not occupied by propellant). Typically, helium is used as a pressurizing gas because it has a low molecular weight (and thus, a low gas density which reduces the inert mass of the rocket and improves performance). Helium also has the advantage that it is chemically unreactive with all propellants, and relatively insoluble in propellants. In use, as the pressurized propellant is fed to the rocket motor, the pressure in the tank drops due to expansion of the gas. When a substantial fraction of the propellant is withdrawn quickly, there is little time for heat transfer from the tank walls. In this case, the gas expands adiabatically rather than isothermally, and the gas cools as it expands which causes even more of a pressure drop.

To counteract the effect of pressure drop as propellant is withdrawn, a separate tank of high pressure gas at ambient temperature may be provided. Gas from this tank is then reduced in pressure by a pressure regulator, and applied to the ullage space of the propellant tank(s). Such "stored gas" systems offer good pressure regulation, but suffer from complexity of plumbing, and have a number of failure modes related to leaking pressure regulators and migration of propellants past check valves. A failure in the helium pressurization system for the bipropellant engine of the Mars Observer is thought to be responsible for the loss of this $1 billion spacecraft.

In the case of a pressure-fed orbital launcher, all propellant needs to be expelled quickly from the tank in a short time period. Large scale versions of the blowdown or stored gas systems may be used. Blowdown systems suffer from excessive vehicle size, while stored gas systems suffer from complexity. Both suffer from relatively heavy inert masses. The performance of such systems may be improved by heating the ullage gas, but this imposes additional complexity.

Higher performance may be gained by storing the pressurizing agent as a liquid, then evaporating it with a liquid fueled gas generator to produce gas of the temperature and pressure needed for tank pressurizing. Such liquid evaporation systems weight less than blowdown or stored gas systems, and thus can be relatively high performing. They are however relatively complex, typically requiring high pressure storage tanks for cryogenic pressurizing agents and gas generators burning auxiliary propellants.

Solid propellant gas generators are simpler, but the temperature of the gas which is produced is too high to be used directly for the pressurization of most propellants without dilution with a vaporizable liquid (which again increases complexity).

Finally, "main tank injection" has been proposed for orbital launchers. In this system, hypergolic propellants are used which chemically react with one another on contact to release large amounts of heat. The typical combination of propellants used is a hydrazine based fuel, with nitrogen tetroxide as an oxidizer. The hydrazine tank is pressurizing by spraying liquid nitrogen tetroxide into it, which causes a violent chemical reaction which generates large volumes of hot gas. The nitrogen tetroxide tank is pressurized by spraying hydrazine type fuel into it which gives the same effect. Main tank injections systems however, are still relatively complex, and suffer from a number of potential problems related to controlling the pressure of the tank when there is a lag period between injection of the hypergolic propellant, and generation of the gas. Furthermore, main tank injection requires the use of highly toxic propellants (all standard hypergolic propellant combinations included at least one very toxic propellant), and generates very high gas temperatures which limits the materials suitable for tank construction. Main tank injection has never been used in an actual launch vehicle.

A number of the above described propellant feed systems are discussed in "Modern Engineering for Design of Liquid Propellant Rocket Engines" by Huzel et al. published by the American Institute of Aeronautic and Astronautics, Vol. 147 (1992), Chapter 5, pp 135–153 inclusive.

U.K. patent application 2051246A published Jan. 14, 1981 by Davies et al. describes an evaporating liquid ammonia to provide a sufficiently high pressure at the expected operating temperature and using a flexible diaphragm to apply the pressure to the liquid fuel.

U.S. Pat. No. 4,132,165 issued Jan. 2, 1979 to Leeson describes a missile employing solid rocket fuel which also heats a liquid that vaporizes to provide pressurized vapor that is used to propel the liquid fuel to a combustor after the solid fuel has been depleted.

U.S. Pat. No. 5,207,399 issued May 4, 1993 to Risenberg describes another vapor pressurizing system disassociates hydrazine and the byproducts used to indirectly heat the fuels, i.e. the oxidizer and the fuel to generate vapor pressures in both of these tanks sufficient to feed each of these propellant components to the engine.

BRIEF DESCRIPTION OF THE PRESENT INVENTION

It is an object of the present invention to provide an improved pressure feed system for delivering a volatile rocket propellant and a second rocket propellant to a rocket engine.

Broadly, the present invention relates to a pressurized propellant feeding system for a rocket engine comprising a source of a volatile liquid rocket propellant and source of a second liquid rocket propellant, storing both said volatile and said second rocket propellants in pressure communicating relationship, said volatile propellant having a vapor pressure sufficiently high to pressurize both said volatile and said second rocket propellants and provide the sole means for forcing said volatile rocket propellant and said second rocket propellant each from its said source to said rocket engine.

Preferably, both said volatile and said second rocket propellant are stored in a single vessel.

Preferably, said volatile and said second propellants are separated from each other by a bladder means.

In some cases said bladder means will comprise a diaphragm.

Preferably said bladder means will comprise a collapsible/expandable bladder containing one of said propellants.

Preferably, said second propellant is contained within said bladder.

Preferably, an outlet for one of said propellants positioned above the other of said propellants will have a density sufficiently higher than said other of said propellants to deform said bladder means and form a sump for receiving said one of said propellants.

Preferably a gas outlet will be provided leading for leading from a zone containing the vapor form of said volatile propellant.

In some cases said volatile and said second rocket propellant are removed from their respective sources in substantially the same direction.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
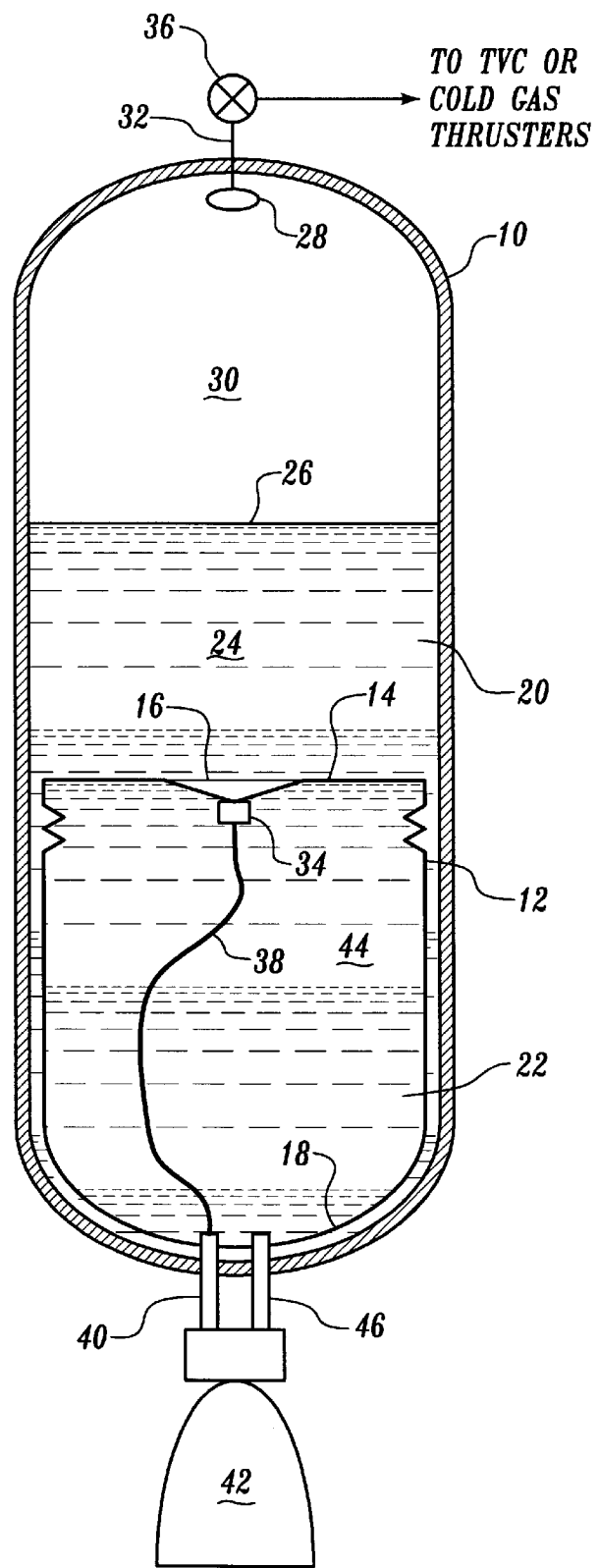
FIG. 1 is a schematic illustration of the first embodiment of the present invention.

In the embodiment shown in FIG. 1, the two rocket propellants, namely the volatile propellant which preferably is the fuel and the other propellant (normally the oxidizer) are contained within the same vessel 10.

In the FIG. 1 embodiment the vessel or container 10 contains a bladder 12 that is collapsible from the full condition which is sized to contain all of the second propellant 44 to a collapsed condition wherein the top 14 of the bladder 12 approaches the bottom 18 and the free space generally indicated at 20 within the tank or vessel 10 is increase in size while the volume within the bladder 12 decreases.

In the FIG. 1 embodiment space 20 external to bladder 12 contains volatile propellant 24 which normally will have an upper surface 26 and a pressurized gaseous atmosphere 30 thereabove (i.e. a vapor zone containing the volatile component in the vapor phase). The gaseous atmosphere 30 is generated by evaporation of the volatile propellant 24 and thus has a pressure substantially equal to the vapor pressure of the volatile propellant 24.

The volatile propellant 24 is withdrawn via an outlet 34. The structure of outlet 34 is sufficiently denser than that of the propellant on which it rests, in the illustrated arrangement, the second propellant 44, so that under gravitational or rocket acceleration it locally depresses the upper surface of the bladder 14 to form a sump 16 for the acquisition of the volatile propellant 24. The outlet 34 is connected via a hose or tube 38 to a fuel outlet 40 that directs fuel to propellant control valves and the rocket engine as schematically indicated at 42.

The bladder 12 surrounds a space 22 which contains the second propellant 44 (oxidizer in the FIG. 1 embodiment) which is removed from the bladder via outlet 46 and directed to propellant control valves and the engine 42.

In the FIG. 1 embodiment the outlets 34 and 46 both remove the propellant components from their respective sources within the vessel 10 in essentially the same direction.

The operation of the system in FIG. 1 and of the other Figures is very similar and uses the pressure of the vapor phase 30 of a volatile propellant 24 to pressurize both the volatile propellant 24 and the second propellant 44 to provide the driving force to eject these propellants from the container 10 and feed them to the rocket motor 42.

In most cases it is desirable to provide a gas tap or outlet 28 leading from the vapor or gas phase zone 30. The outlet is constructed of material that permits the passage of the gas phase but prevent outflow of liquid. The vapor leaving though outlet 28 passes via line or tube 32 under control of the valve 36 to where it will be used as intended for example to be used for main engine thrust vector control (TVC), cold gas thrusters, or the like.

Liked parts have been indicated with like reference numerals in the various embodiments.

Figure 2:
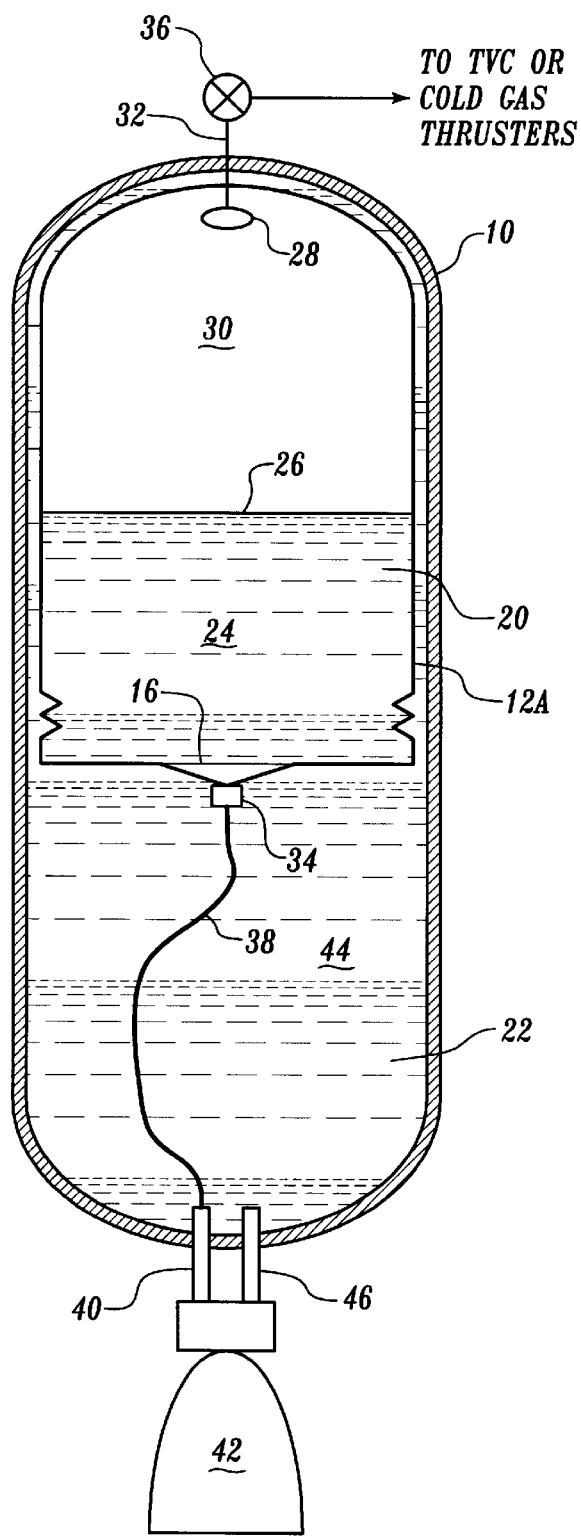
FIG. 2 is a similar schematic section of a second embodiment of the present invention.

In the embodiment illustrated in FIG. 2, the bladder 12 has been replaced by a different bladder 12A enclosing space 20 that contains the volatile propellant 24 to a level 26 above which is propellant vapor 30.

In this embodiment, the second propellant 44 is contained within the space 22 external to bladder 12A. As in the previous embodiment the second propellant 44 is withdrawn from the vessel 10 via the outlet 46 and fed to the engine 42. The volatile propellant contained within the bladder 12A is directed out through sump 16, outlet 34 and the connecting tube 38 to the outlet 40 and then to the engine as indicated at 42.

In the FIG. 2 embodiment the bladder 12A must expand via the internal pressure to substantially fill the vessel 10 when the second propellant 44 has been ejected.

Figure 3:
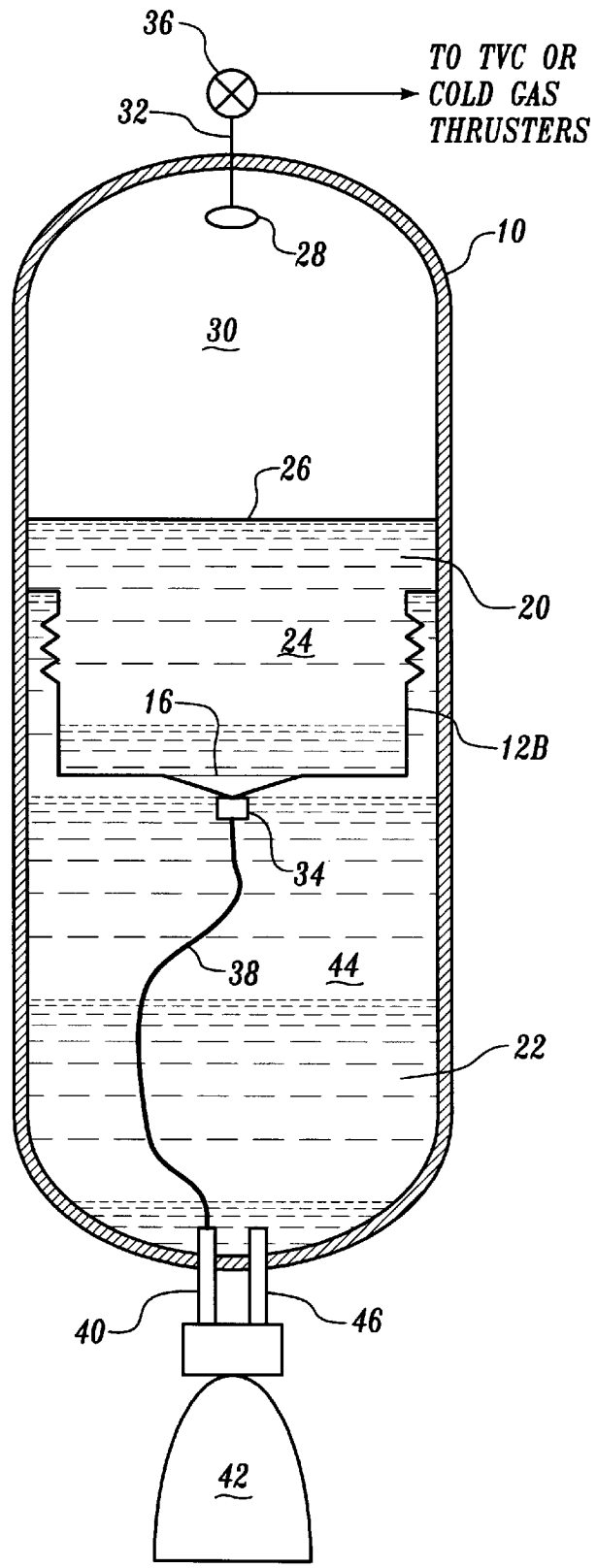
FIG. 3 shows a similar view of a third embodiment of the present invention.

Turning now to FIG. 3, in this embodiment the bladder 12 or 12A has been replaced by a diaphragm 12B attached to the tank walls to separate space 20, which contains the volatile propellant 24 to a level 26 above which is propellant vapor 30, from space 22 which contains the second propellant 44. The volatile propellant 24 and second propellant 44 are withdrawn or driven from vessel 10 by the pressure of the vapor 30 in the same manner as the two propellants are driven from the vessels 10 in FIGS. 1 and 2 embodiments. The diaphragm 12B must have sufficient slack to conform with the shape of the vessel 10 as the interface between spaces 20 and 22 is driven along the length of vessel 10 as the second propellant 44 is removed, while maintaining the separation of the two propellants.

In the embodiments shown in FIGS. 1, 2 and 3 the volatile propellant is conducted to the bottom of the tank by a descending hose or connecting tube 38. It is also feasible in alternate embodiments of the invention to route this tube from the sump 16 and outlet 34 so that it exits the tank through the side or top of the tank, from which position an external propellant line descends to the engine. As an alternative to the use of a sump-forming outlet 34 and a flexible connecting tube 38 in the FIG. 1 embodiment, a rigid channel attached to the tank wall and extending from the space occupied by the volatile propellant to the bottom of the tank may be used. Said channel is perforated throughout its length, and is designed to act as a bladder stand-off device which creates an unrestricted flow path by which the volatile propellant can flow past the bladder containing the second propellant and reach an outlet in the tank bottom.

In the embodiments shown in FIGS. 1, 2 and 3, a flexible membrane (bladder means) in the form of bladder 12 or 12A or diaphragm 12B is used to divide the interior of the vessel into two spaces, 20 and 22. In these embodiments, space 20 contains the volatile propellant 24 and its vapor 30, while space 22 contains the second propellant 44.

Alternatively, if the propellants used are not hypergolic and can be safely stored in contact with one another, the bladder or diaphragm may be dispensed with. In this alternate embodiment the volatile propellant 24 is withdrawn through an outlet fitting analogous to 34 which has a density intermediate between that of the volatile propellant 24 and the second propellant 44. The outlet thus floats at the interface between the two propellants, and the volatile propellant 24 is withdrawn from the upper surface of the outlet structure through a hose or tube 38.

Obviously some of those embodiments wherein there is not a bladder means which positively separates the two propellants do not lend themselves to use under free fall conditions (i.e. zero gravity).

Figure 4:
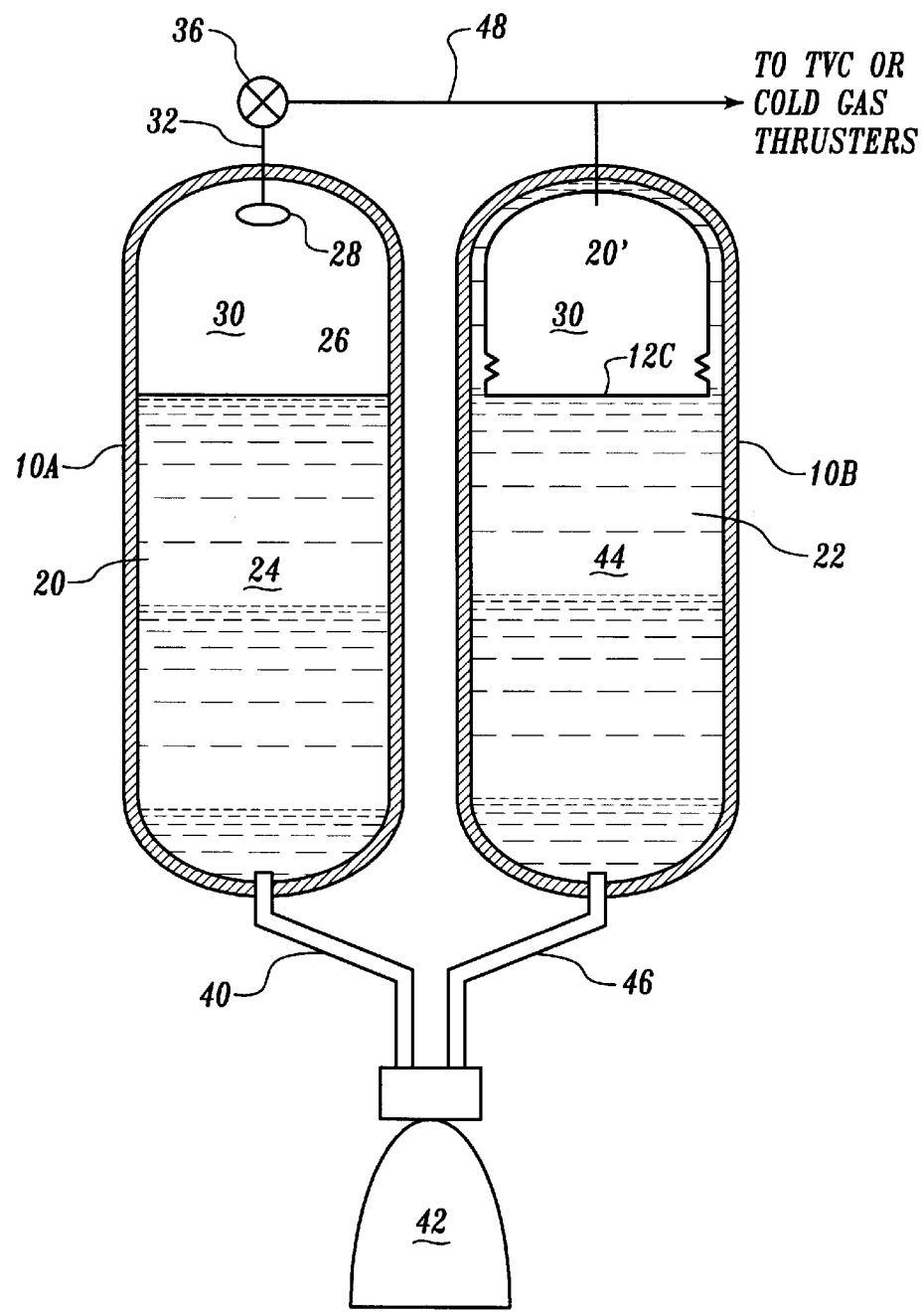
FIG. 4 shows a fourth embodiment of the present invention.

In the FIG. 4 embodiment, two separate vessels 10A and 10B are used. The volatile propellant 24 is contained in vessel 10A. Some of this propellant evaporates to form a vapor phase 30 which pressurizes space 20 in the vessel 10A and this pressurized vapor is conducted via a gas outlet 28, tube 32, valve 36 and interconnecting tube 48 to the vessel 10B to provide the same pressure in the space 20' in the vessel 10B as in vessel 10A. Line 48 also provides gas for TVC or cold gas thrusters. The second propellant is contained within space 22 in vessel 10B. The propellants 24 and 44 are driven from their respective vessels 10A and 10B through the outlets 40 and 46 respectively to the rocket engine 42.

The pressurized gas in space 20' in vessel 10B is preferably contained with an expandable bladder 12C. Alternately, the second propellant 44 could be contained in a collapsible bladder as shown in FIG. 1 or a diaphragm could be used to separate the gas and the second propellant 44. Separation of the gas and second propellant could also be accomplished by dispensing with the bladder means and using a thin layer of an immiscible and chemically inert liquid floating on top of the second propellant. Yet another alternative suitable for relatively non-reactive propellant combinations would be to use neither a bladder nor a diaphragm but to have the gas from vessel 10A directly contact and apply pressure to the second propellant 44 in the vessel 10B.

In the FIG. 4 embodiment a valve 36 is provided in the tube 48 to isolate the vessel 10A from the vessel 10B. With this arrangement the valve is maintained in the closed position isolating the two vessels 10A and 10B and opened when the engine is to be started.

The invention is most easily used with rocket propellants maintained at room temperature, where suitable materials for flexible bladders or diaphragms 12, 12A, 12B, 12C and fuel pickup lines 38 are readily available.

Composite materials such as Kevlar/epoxy or carbon fiber/epoxy are particularly suitable for pressure vessel 10, 10A, 10B construction, as they are light for their strength. Because the vessels operate near ambient temperature, there is no need for metal construction or heat resistant composite materials.

The flexible bladders or diaphragms shown for example at 12, 12A, 12B, 12C are preferably not under tension—the liquid pressure is the same on either side and the bladders or diaphragms are preferably made large enough to accommodate their maximum extension without stretching. The bladders for example may be though of as a "bag" rather than a "balloon".

Obviously, the bladder or diaphragm material must have chemical compatibility with both the fuel and oxidizer, suitable strength and abrasion resistance, and must be easily formed into bladders or diaphragms of the required dimensions using leak-proof joints.

The volatile propellant 24 must have the following characteristics:

be a good fuel or oxidizer for a bipropellant rocket engine be chemically compatible with materials suitable for system construction have adequate vapor pressure at the initial operating temperature of the rocket to provide the needed pressurization for rocket engine ignition and initial operation have physical properties such that sufficient volatile propellant can evaporate to complete the expulsion of both the fuel and oxidizer from the propellant supply system of a bipropellant rocket engine without its vapor pressure dropping below the pressure required for rocket engine operation. Typical lower pressure limits for conventional bipropellant engines are approximately 1 MPa tank pressure.

Candidate volatile propellants include:

nitrous oxide ethane

C3 and higher hydrocarbons containing dissolved methane, ethylene or ethane to provide vapor pressure.

Since fuel and oxidizer are stored in the same tank separated only by a bladder means, the most suitable combinations of propellants are those which are not hypergolic with each other (and thus would not cause an explosion should a hole develop in the bladder means).

Suitable non-hypergolic oxidizers for hydrocarbon fuels include hydrogen peroxide, perchloryl fluoride, nitrogen tetroxide, and various grades of nitric acid. The most favored oxidizer is hydrogen peroxide, due to its good performance, low cost, high density and lack of nitrogen tetroxide toxicity. Nitromethane, nitroethane and nitropropane are believed to be suitable fuels for use with nitrous oxide as they have a low oxidizer to fuel ratio (to minimize the volume occupied by the relatively low density nitrous oxide) and have a density higher than that of nitrous oxide (important for embodiments illustrated in FIGS. 1, 2 and 3).

As the propellants are withdrawn from the tank 10, the volatile propellant 24 evaporates to provide pressurizing gas. As evaporation takes place, the energy for evaporation is withdrawn primarily from the volatile propellant 24, which cools in spite of a certain amount of heat flow from the tank walls and the other propellant 44 in the tank. As the volatile propellant cools, its vapor pressure drops and the pressure throughout the propellant tank drops correspondingly.

Because only a fraction of the volatile propellant 24 evaporates, it will only cool modestly as the propellants are expelled from the tank. The remainder of the somewhat cooled volatile propellant is burned in the engine. In effect, the volatile propellant is acting as its own heat sink for provision of energy for liquid evaporation. This distinguishes this system from a conventional liquid evaporation propellant pressurization system, which relies on an external source of heat to provide the energy needed for evaporation.

If mixed volatile propellants are used, the propellant mix will be selectively depleted of its volatile component as it evaporates. This will act to lower the vapor pressure of the mix continuously as the propellants are withdrawn via a mechanism independent of the lowering of vapor pressure due to temperature drop.

The progressive pressure drop caused by propellant cooling and by depletion of volatile components acts to automatically reduce tank pressure and thus rocket thrust throughout a rocket burn. This gives a form of automatic throttling which usefully limits the final acceleration of the rocket.

The performance of the described system depends strongly on the final density of the pressurizing gas at the end of a rocket bum (the lower the better). This drives the system to use volatile propellants which generate a low molecular weight gas phase. For a given volatile propellant, the gas density depends on the final pressure and temperature of the gas. Rocket performance may thus be improved by arranging the propellant supply system to have a low tank pressure at the termination of the rocket burn (even if for performance reasons pressure was high at the beginning of the bum), and/or by heating the pressurizing gas. These refinements are not absolutely required for the implementation of the system, as volatile propellants such as ethane or ethane mixed with higher hydrocarbons give good performance even in a simple passive sealed system following its natural pressure and temperature history.

To reduce the pressure (and thus, the gas density and mass at the end of a rocket burn), pressurant gas may be bled from the top of the tank during liquid propellant withdrawal, and used for a variety of purposes. The bleeding of gas causes a pressure drop which increases evaporation of the liquid phase of the volatile propellant. This in turn cools the liquid, which lowers its vapor pressure, driving down the tank pressure more rapidly than would happen otherwise.

To increase the temperature of the pressurizing gas (and thus, reduce its density), hot gas from a solid or liquid gas generator may be injected into the ullage space of the tank. Alternatively, decomposed hydrogen peroxide (which produces a jet of hot steam and oxygen which spontaneously reacts with hydrocarbon vapors) may be used.

When all but residual liquid propellant has been expelled from the tank, the tank will still contain a substantial mass of high pressure gas. After the main engine has shut down, this gas may be exhausted through the engine, recapturing heat from the still-hot engine and giving a small additional amount of thrust to improve the rocket performance.

The operation of the pressurization system naturally generates a large mass of high pressure gas in the ullage space of the tank. This may be tapped for other uses by a fitting at the top of the compartment containing the volatile propellant. For zero gravity operations, a liquid blocking device may be used to ensure that only gas is removed from the tank. Gas withdrawn in this way may be used in a gas injection thrust vector control system for the main engine. The same gas can be used in cold gas thrusters for roll control and for stage separation maneuvers (replacing the solid rockets normally used for the latter). In upper stages gas may be used in cold gas thrusters for attitude control, propellant settling, minor course corrections, and rendezvous maneuvers.

Volatile propellants used for tank pressurization are always just at their boiling temperature in tanks. A small pressure drop will thus cause vapor formation. At the engine of an accelerating vehicle, the volatile propellant is under a modest hydraulic head, but it is likely that any attempt to throttle its flow will result in cavitation and two phase flow downstream of the valve, which may be undesirable in the engine injector. Propellant feed systems for the volatile propellant are likely therefore to be designed to minimize pressure drops, and use an engine shutoff valve which provides an unrestricted flow path when open. With "wide-open" volatile propellant flow to the engine, any adjustment to mixture ratio must then be done by throttling the other propellant. An alternative solution to the problem of potential two phase flow in injectors is to vaporize all of the volatile propellant before leading it to the injector, using a regenerative cooled thrust chamber or other suitable method of heating.

In most practical implementations of the invention, the propellant with the lower vapor pressure is positively expelled by a bladder or diaphragm system, and thus, is available under zero gravity conditions without a propellant settling maneuver.

In zero gravity conditions, a propellant settling maneuver is required before main engine ignition to ensure pickup of the volatile propellant. This can be done by the vehicle attitude control system. Alternatively, if the lower vapor pressure propellant is a monopropellant (e.g. hydrogen peroxide), the rocket engine may be operated in monopropellant mode first to settle the volatile propellant prior to bipropellant operation.

Having described the invention, modifications will be evident to those skilled in the art without departing from the scope of the invention as defined in the appended claims.

I claim:

1. A pressurized fuel feeding system for a rocket engine comprising a source of a volatile liquid rocket propellant and a source of a second liquid rocket propellant, storing both said volatile and said second rocket propellants in a pressure communicating relationship, said volatile propellant having a vapor pressure sufficiently high to pressurize both said volatile and said second propellants and provide substantially the sole means for forcing said volatile rocket propellant and said second rocket propellant each from its said source to said rocket engine.

2. A system as defined in claim 1 wherein said system includes a common vessel in which both said sources of said volatile and said second propellants are contained.

3. A system as defined in claim 1 further comprising a bladder means separating said volatile and said second propellants.

4. A system as defined in claim 2 further comprising a bladder means separating said volatile and said second propellants.

5. A system as defined in claim 3 wherein said bladder means comprises a collapsible/expandable bladder containing one of said volatile and said second propellants.

6. A system as defined in claim 4 wherein said bladder means comprises a collapsible/expandable bladder containing one of said volatile and said second propellants.

7. A system as defined in claim 3 wherein said bladder means is a diaphragm.

8. A system as defined in claim 4 wherein said bladder means is a diaphragm.

9. A system as defined in claim 4 wherein said second propellant is contained within said bladder and said bladder collapses as said second propellant is removed therefrom.

10. A system as defined in claim 1 said system includes a first vessel containing said volatile propellant and said second vessel containing said second propellant and passage means interconnecting said first and second vessels.

11. A system as defined in claim 10 wherein valve means are provided in said passage means to control flow through said passage means.

12. A system as defined in claim 10 further comprising a bladder means within said second vessel, said bladder means isolating said second propellant from said volatile propellant.

13. A system as defined in claim 11 further comprising a bladder means within said second vessel, said bladder means isolating said second propellant from said volatile propellant.

14. A system as defined in claim 12 wherein said bladder means is a collapsible/expandable bladder containing gas generated from said volatile propellant.

15. A system as defined in claim 9 wherein said bladder means is a collapsible/expandable bladder containing gas generated from said volatile propellant.

16. A system as defined in claim 4 wherein an outlet is provided through said bladder means said outlet having a density sufficiently higher than a one of said propellants on which the area of said bladder means in which said outlet is located is supported so that said area is deformed under gravity to form a sump into which the other of said propellants flows.

17. A system as defined in claim 6 wherein an outlet is provided through said bladder means said outlet having a density sufficiently higher than a one of said propellants on which the area of said bladder means in which said outlet is located is supported so that said area is deformed under gravity to form a sump into which the other of said propellants flows.

18. A system as defined in claim 8 wherein an outlet is provided through said bladder means said outlet having a density sufficiently higher than a one of said propellants on which the area of said bladder means in which said outlet is located is supported so that said area is deformed under gravity to form a sump into which the other of said propellants flows.

19. A system as defined in claim 1 further comprising a gas outlet means communicating with a space containing vapor generated by said volatile propellant.

20. A system as defined in claim 2 further comprising a gas outlet means communicating with a space containing vapor generated by said volatile propellant.

* * * * *